United States Patent [19]

Aguirre-Gandara et al.

[11] Patent Number: 5,125,496
[45] Date of Patent: Jun. 30, 1992

[54] ARTICLE TRANSFER PUSHER

[75] Inventors: Manuel Aguirre-Gandara, Alpes; Ignacio Teran-Flores, Villa De San Miguel, both of Mexico

[73] Assignee: Vitro Tec Fideicomiso, Monterrey, Mexico

[21] Appl. No.: 682,844

[22] Filed: Apr. 4, 1991

Related U.S. Application Data

[63] Continuation of Ser. No. 517,393, Apr. 27, 1990, abandoned, which is a continuation of Ser. No. 357,707, May 25, 1989, abandoned, which is a continuation-in-part of Ser. No. 107,969, Oct. 13, 1987, abandoned.

[30] Foreign Application Priority Data

Oct. 14, 1986 [MX] Mexico .................................. 4020

[51] Int. Cl.$^5$ ............................................. B65G 25/00
[52] U.S. Cl. ......................................... 198/430; 198/740
[58] Field of Search ...................... 198/429, 430, 468.1, 198/740

[56] References Cited

U.S. PATENT DOCUMENTS

| | | | |
|---|---|---|---|
| 3,424,030 | 1/1969 | Mennitt | 74/675 |
| 4,290,517 | 9/1981 | Hafferkamp | 198/430 |
| 4,480,741 | 11/1984 | Chicurel et al. | 198/430 |
| 4,660,711 | 4/1987 | Alonso et al. | 198/430 |

*Primary Examiner*—Joseph E. Valenza
*Attorney, Agent, or Firm*—Abelman Frayne and Schwab

[57] ABSTRACT

A pusher apparatus, particularly for the handling of glassware articles from a cross conveyor in which continuous lines of articles are formed, to a perpendicular linear conveyor of a lehr in a common plane, in a transference cycle comprised of pushing and return strokes, is provided with an adjusting mechanism that can be operated while the apparatus is in operation, to impart a plurality of velocity profiles to said pushing and return strokes.

4 Claims, 8 Drawing Sheets

ARTICLE TRANSFER PUSHER

This application is a Rule 62 Continuation of application Ser. No. 517,393, filed Apr. 27, 1990, now abandoned, which itself is a Rule 62 Continuation of application Ser. No. 357,707 filed May 25, 1989, now abandoned, which itself is a Continuation-in-Part of Parent application Ser. No. 107,969 filed Oct. 13, 1987, now abandoned.

BACKGROUND OF THE INVENTION

In the production of glass containers, such as bottles, jars, etc., is an automatic machine of the I. S. type, molten glass in the form of gobs is fed and distributed by means of a distributor, to the individual forming sections (generally eight) where the glass is shaped into a container.

The containers formed by each of the individual forming sections of the machine, while still hot, are deposited first on the dead plate of the respective section and from there they are pushed up to a transfer conveyor called a "carrier" which moves the containers of all of sections up to a "transfer" placed at the end of the carrier. The transfer regulates the movement of the containers separating them uniformly and changing their direction of travel by 90°, and deposits them one by one, uniformly spaced in a row, on a cross conveyor. Once a complete row is formed, a transfer device or mechanical pusher, simultaneously transfers all the containers from the cross conveyor to the lineal conveyor of the lehr, wherein they are exposed to a tempering process which eliminates the residual stress accumulated in the glass due to fast cooling during the fabrication process.

Pusher devices of the prior art generally consist of a pusher rod which pushes the bottles or articles advancing in a row on the cross conveyor, to the edge of the lehr belt. The movements of the pusher rod and the "transfer" are synchronized to coordinate the operation of loading the operation of loading glass articles into the lehrs. The pusher rod is generally coupled to a frame which transmits movements of pushing, elevation and return, for each row of bottles formed on the cross conveyor.

An example of known pusher apparatus may be found in U.S. Pat. Nos. 3,040,867; 3,184,031; 3,960,266 and 4,067,434.

Up to now, this type of pusher has been considered to be the most functional because 90% of the bottles produced are conveyed in the range of velocities that can be handled.

Nevertheless, the introduction of faster mechanisms such as the I. S. machine of ten sections and greater production output will require handling a greater quantity of articles in a smoother and faster way without causing the articles to fall during the pushing transfer.

In practically all the pusher apparatus in use today, was observed that during the same operation cycle, the pushing stroke time with respect to the return stroke time remained constant; the latter being independent of the operation speed (cycles per minute) of the pusher.

Taking into consideration the limitation of the pushers of the previous art to vary the pushing stroke time, it was observed that because on the return stroke no article is handled, and, therefore, a smooth path is not necessary, it is possible to increase the timing of the pushing stroke while decreasing the timing of the return stroke. This concept was claimed in the U.S. Pat. No. 4,480,741 (Mexican Patent No. 151,734). Basically the improvement consisted in the coupling of a quick return mechanism between the drive system and the cams of the pusher. Through this coupling, it was possible to increase the pushing stroke time (making it smoother) at the expense of the return stroke time.

Because of its very smooth pushing motion, the pusher claimed in U.S. No. 4,480,741 is particularly effective for handling unstable articles. However, there is a large variety of articles of medium and high stability which may be handled advantageously with a fast pushing action resulting in higher production volumes per unit of time. The disadvantage of the pusher claimed in U.S. Pat. No. 4,480,741 is that it lacks the versatility to handle the required high production volumes of the more stable variety of articles.

In order to eliminate the disadvantage of the pusher described in U.S. Pat. No. 4,480,741, a phase shifter mechanism or also called adjusting mechanism, was coupled between the quick return mechanism and the cams. Likewise, the phase shifter mechanism also can be coupled between the drive mechanism and the quick return mechanism. This way, the pusher can be adjusted in multiple pushing embodiments without the need to stop either the pusher or the production line, thereby avoiding time and production losses.

In this manner, the pusher of the present application permits adjustment of the velocity of the pusher mechanism at any instantaneous point throughout of the complete cycle of movement of the pusher.

Through the use of the present invention, any type of container can be handled in an optimum manner, for example, from slim and unstable containers to those of a large diameter, using the ideal pushing time independent of the velocity of the pusher.

BRIEF DESCRIPTION OF THE INVENTION

Taking into account the defects in the previous art, a principal objective of the present invention is to provide an article transference apparatus which can be adjusted in multiple time embodiments of the pushing and return strokes, within a given cycle duration.

Another objective of the present invention is to provide an article transference apparatus which will permit the handling of each container with the ideal pushing velocity.

An additional objective of the present invention is to provide an article transference apparatus which is capable of handling high production speeds.

Another objective of the present invention is to provide an article transference apparatus which has a high efficacy and efficiency.

These and other objectives and advantages of the present invention will be obvious to the experts in the field with the following detailed description of the invention through the attached drawings.

BRIEF DESCRIPTION OF THE DRAWINGS.

A description of the invention follows which will make reference to an embodiment of same, illustrated with reference to the drawings, wherein the numbers refer to the same parts shown in the figures.

DETAILED DESCRIPTION OF THE INVENTION

Figure 1:
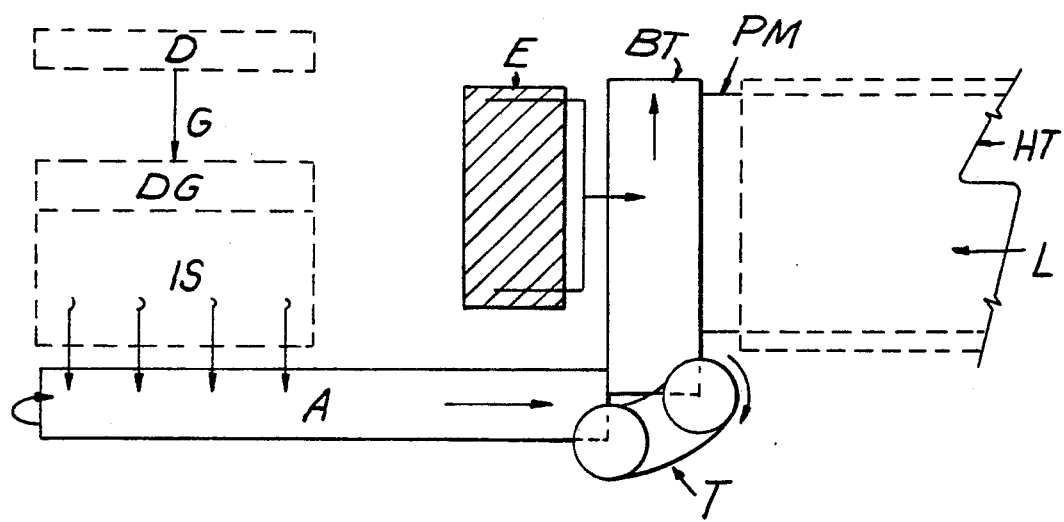
FIG. 1, is a schematic diagram of the manufacturing process of the glass container.

Referring first to FIG. 1, which shows a schematic diagram of the manufacturing process of glass containers such as bottles, jars, etc., molten glass in the form of gobs is fed through a feeder D in the form of gobs G which are distributed by means of a distributor DG to the individual forming sections S (generally eight) given the desired form. The containers formed by each one of the individual forming sections S of the I.S, machine, while still hot, are deposited first on the dead plate of the respective section (not shown) and from there they are pushed onto a conveyor A. A transfer T regulates the passage of the containers, separating them uniformly and changing the direction of their path 90° and deposits them one by one in line and uniformly spaced on a cross conveyor BT. Once a complete row is formed, a transfer device or pusher E simultaneously transfers the entire row of containers from the cross conveyor BT through transition dead plates PM to the lineal conveyor L of a lehr HT.

Figure 2:
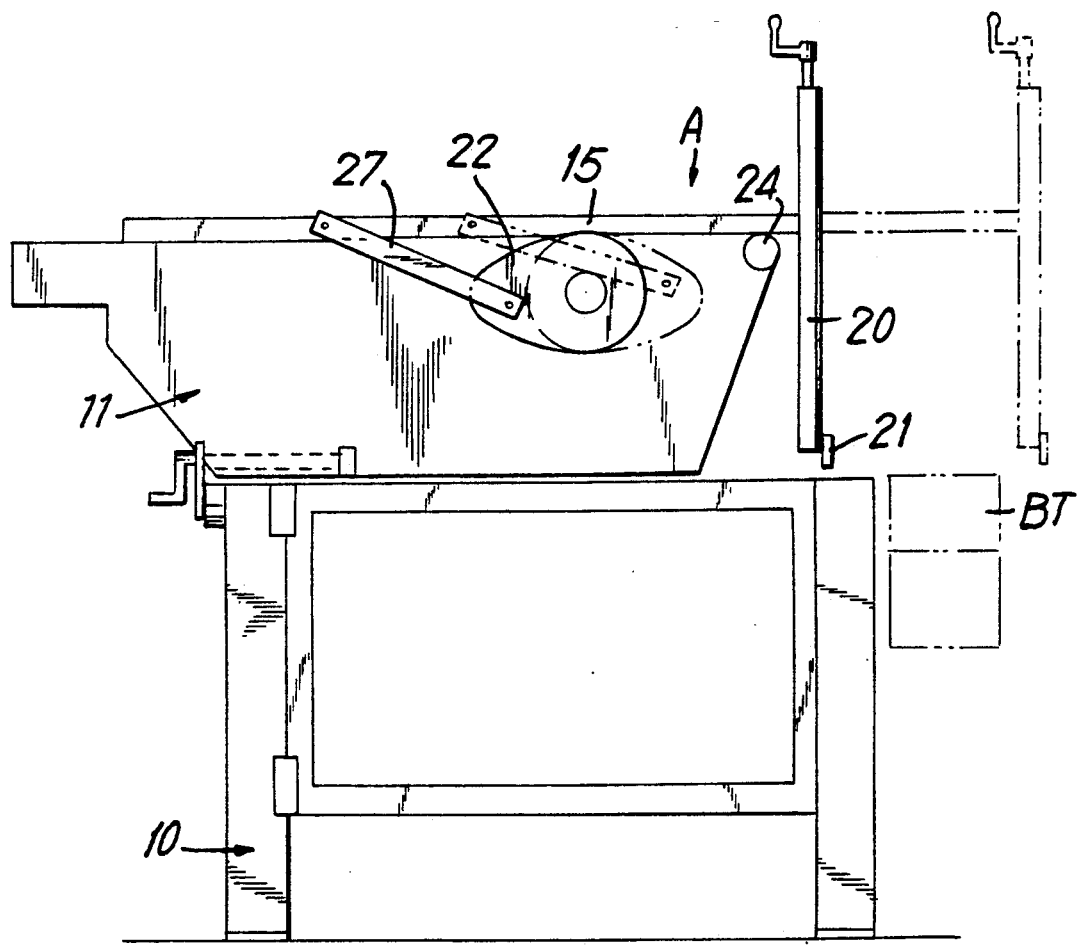
FIG. 2, is a lateral view of the article transference apparatus of the present invention.
Figure 3:
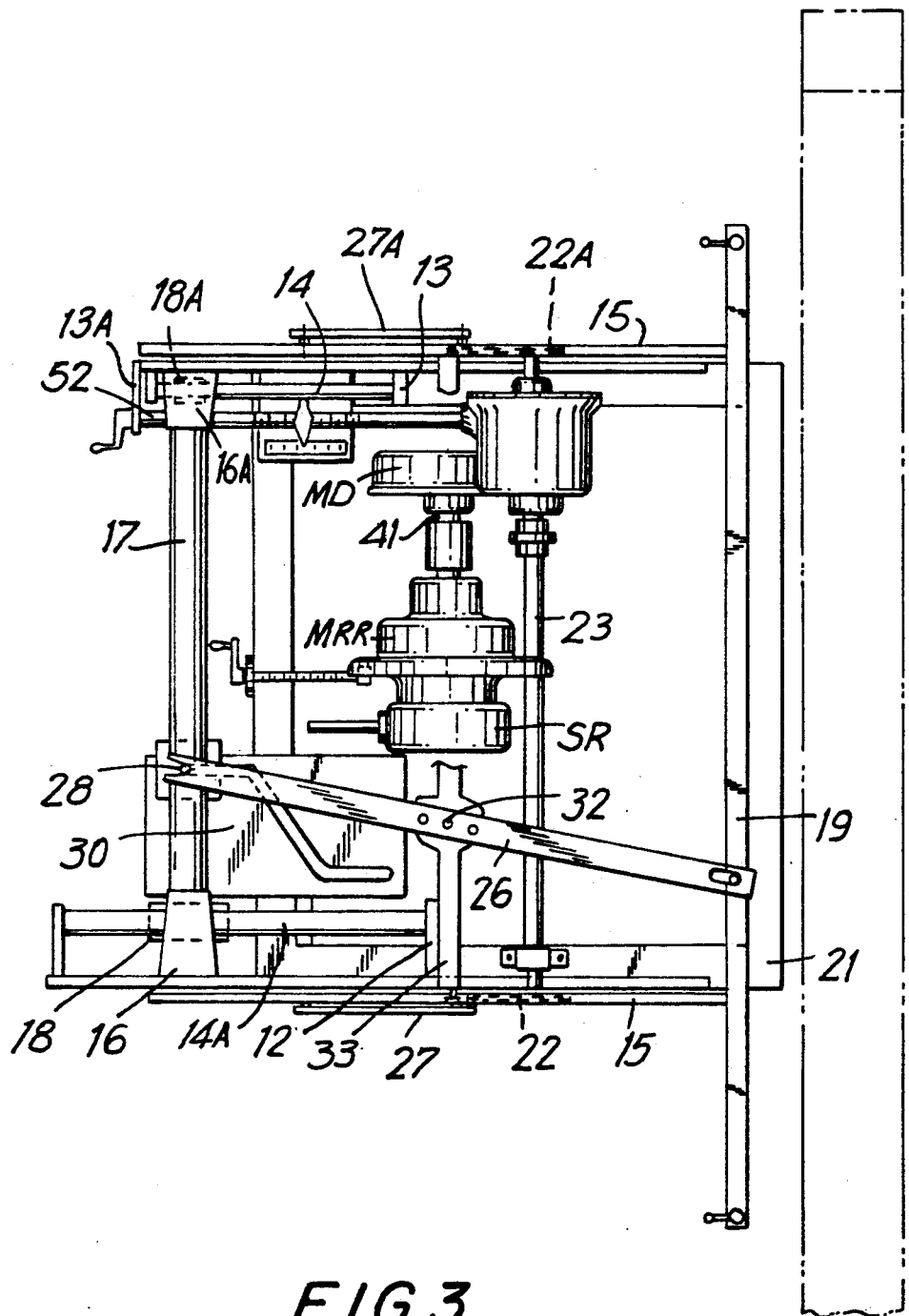
FIG. 3, is another view which shows the upper part of the article transference apparatus of the present invention.

Referring now to FIGS. 2 and 3, the article transfer mechanism of the present invention is constituted by a base 10, which supports all of the components of the apparatus. A support frame 11 is mounted on the base 10, and located in alignment with the entrance of the lehr HT (FIG. 1). A drive system comprising a motor and a reducer system SR, is placed at the middle of the support frame 11, for driving the transfer apparatus.

The support frame 11, includes a pair of supports, 12, 12A and 13, 13A, laterally placed in the rear end of said frame 11. Shafts 14A and 14, extends respectively between said supports 12, 12A and 13, 13A.

A movable frame A (FIG. 2) is formed by a rectangular frame, and same includes a pair of lateral rails 15, 15A (FIG. 3), each one of which has a support 16, 16A, attached to the rear end. A shaft 17, attached between the supports 16, 16A, connect the rails 15, 15A, in the rear end section. A bushing with bearings 18, 18A, is attached to the lower part of each support 16, 16A, and is slidable on the shafts 14, 14A, in such a manner that said frame A, has a forward and backward movement on said shafts 14, 14A.

The front end of the rails 15, 15A, is fixed to a shaft 19 connected at its ends to a second rectangular frame 20. Said frame 20, has attached to its lower part a pusher bar 21, which pushes the bottles transversely of the cross conveyor BT and cross the dead plate PM, and then from the dead plate PM and to the lineal conveyor L of the lehr HT.

Figure 4:
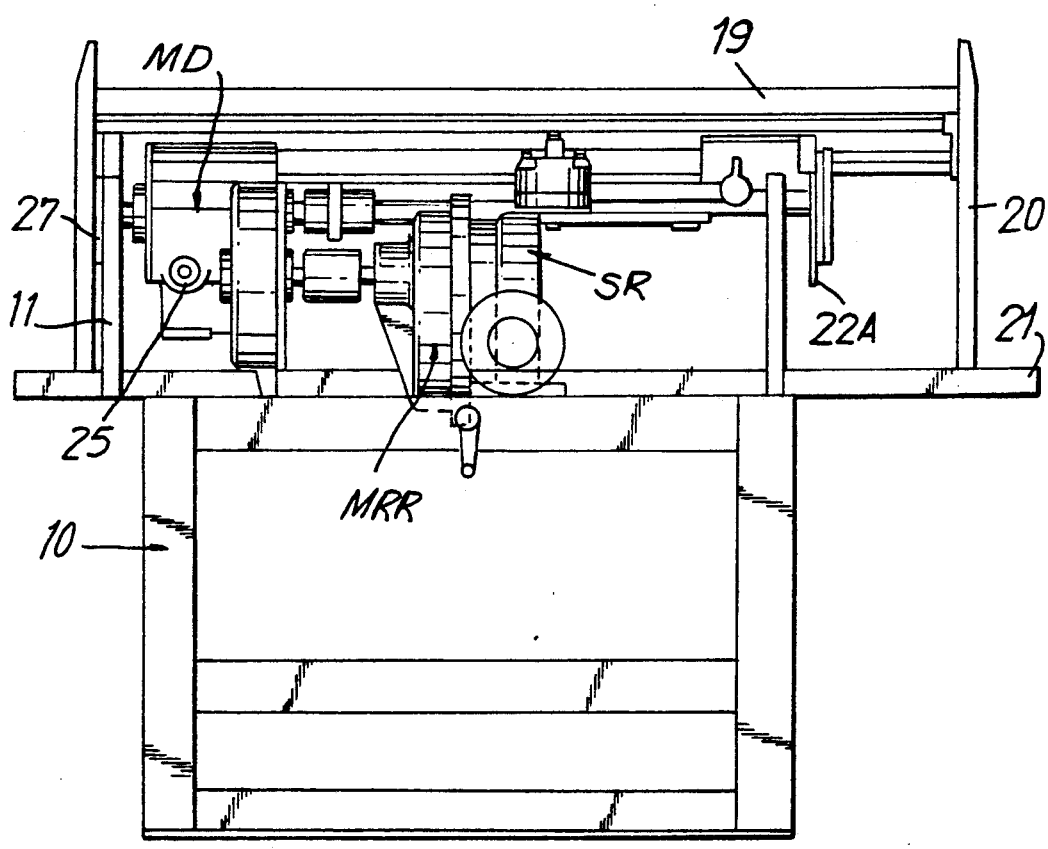
FIG. 4, is a view from the rear of the apparatus shown in FIGS. 2 and 3.

However, on return movement of the frame A, it is necessary that said frame A is raised to prevent the pusher bar 21 from knocking down the bottles which are forming on the cross conveyor BT. This upward movement is carried out by means of a pair of lobe cam members 22, 22A (FIG. 4) which are attached respectively to shaft 23. The lobe cam members 22A are connected to make contact with the rails 15,15A, and determine the forward, upward and backward movement of frame A. These movements are carried out by the attachment of a pair of bars 27 (only one is shown in FIG. 2) which are pivotally connected at one end to lobe cam members 22, 22A, and at its opposite end to rails 15, 15A, respectively. A pair of rollers 24, located at the front part of support frame 11, support the front end of rails 15, 15A when they are sliding in the pushing operation of the transfer apparatus.

The pusher 21, has a first motion to move it into contact with containers travelling on the conveyor BT, followed by a second movement in a forward and lateral direction, the lateral movement being at a velocity which is equal to the velocity of the cross conveyor BT, and then a third motion transverse to said cross conveyor BT up to a point just beyond the beginning of the linear conveyor L of the lehr HT. Once that the said movement has been carried out, the pusher bar 21, retracts with a upward and a return movement to its initial position.

These movements are provided by a horizontal bar 26, which is connected at one end to the shaft 19, and at its opposite end to a roller 28. The roller 28 is positioned to follow a cam track of a cam plate 30 located in the rear end of the support frame 11. The horizontal bar 26 is pivoted at its middle part to a pin 32, attached to an arm 33, which is only illustrated to obtain a better view of the present invention. The ends of arm 33, are connected to the rails 15, and 15A by means of posts (not shown).

The movement of the movable frame A is carried out by means of a variable velocity mechanism of fixed cycle comprising the drive system, the quick return mechanism MRR and the lobe cam members 22, 22A.

Now making particular reference to the attachment between the reducer system SR and the lobe cam members 22, 22A (FIG. 3), this is carried out by means of a quick return mechanism MRR. Said quick return mechanism MRR is connected between the output shaft of the reducer system SR and a input shaft of a phase shifter mechanism MD. An output shaft of the phase shifter mechanism MD is connected to the lobe cam members 22, 22A. Through this coupling the timing of the pushing and return stroke of the pusher bar 21 can be adjusted in accordance with an ideal pushing velocity for each type of article.

Figure 5:
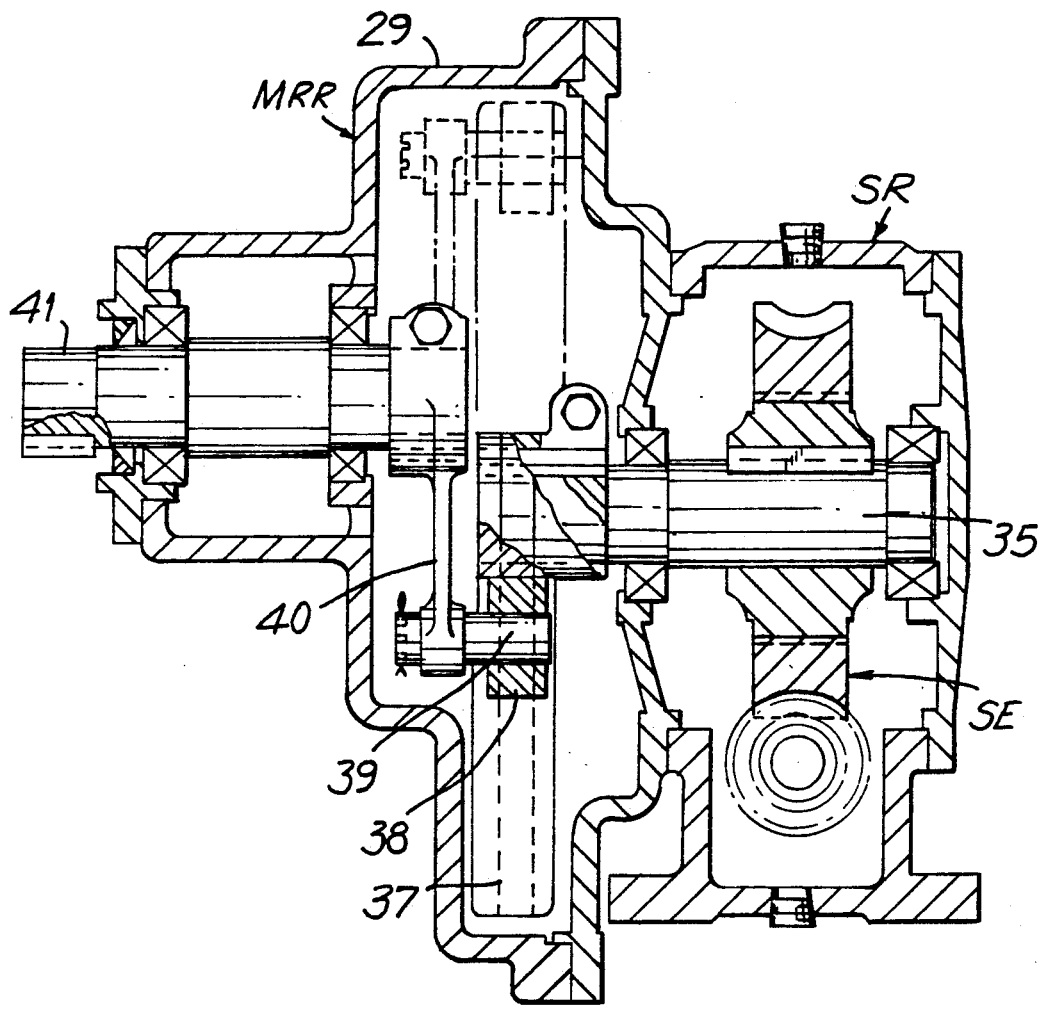
FIG. 5, is a detailed view of a quick return mechanism which is coupled with the phase shifter mechanism of the present invention.

The quick return mechanism MRR, is shown in FIG. 5 and comprises a housing 29, and a variable length drive crank 37, attached to the output shaft 35 of the reducer system SR and which rotates at a constant velocity. A slide 38 which slides back and forth along drive crank 37; a crank arm 40, pivotally connected by one end through pin 39 to the slide 38 and by the other end to an output shaft 41 having its axis displaced from the axis of the shaft 35.

When the motor (not shown) drives the reducer system SR, the drive crank 37 is rotated at a constant angular velocity, and the crank arm 40 is caused to rotate at a variable angular velocity due to the displacement between the respective axes of rotation and the variable length throw of the crank 37. This mechanism permits an increase of time of the pushing stroke of the pusher 21 at the expense of the time of the return stroke, or vice versa. This however is a fixed relationship.

However, as has already been explained, the present invention provides for adjustment of said relationship without the need to stop the pusher apparatus, so that an optimized pushing velocity can be used for each type of container.

In order to carry out said adjustment operation, a phase shifter mechanism MD is interposed between the quick return mechanism MRR, and the lobe cam members 22, 22A.

Figure 6:
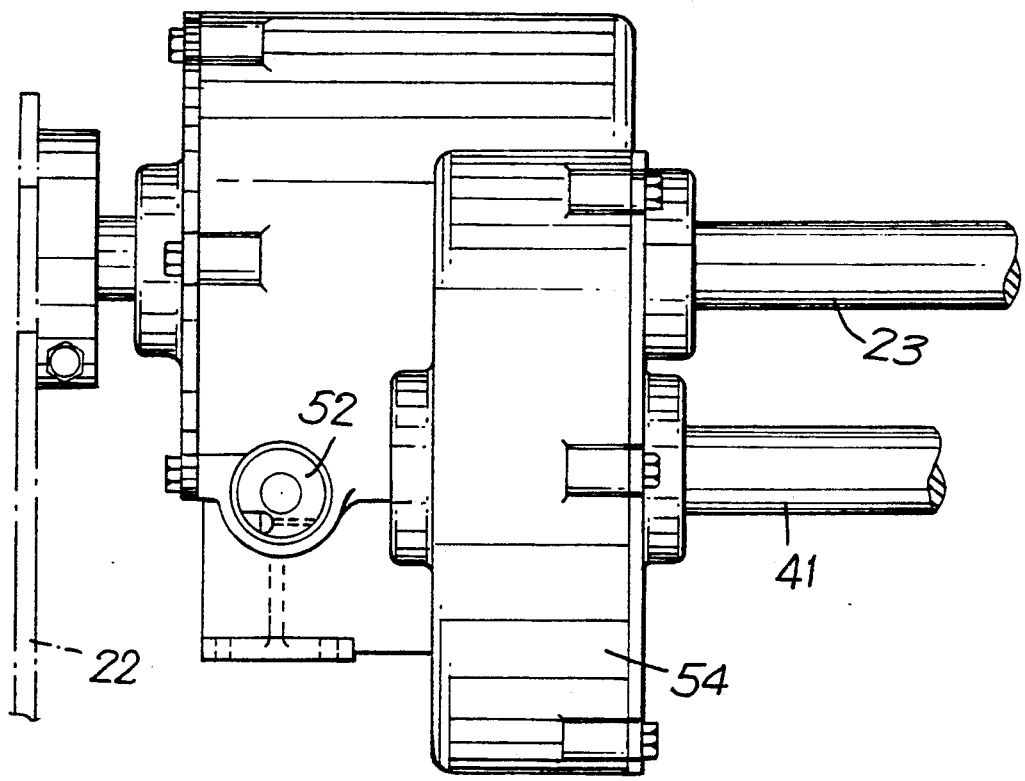
FIG. 6, is a view of the back part of the phase shifter mechanism used in combination with the apparatus of the present invention.
Figure 7:
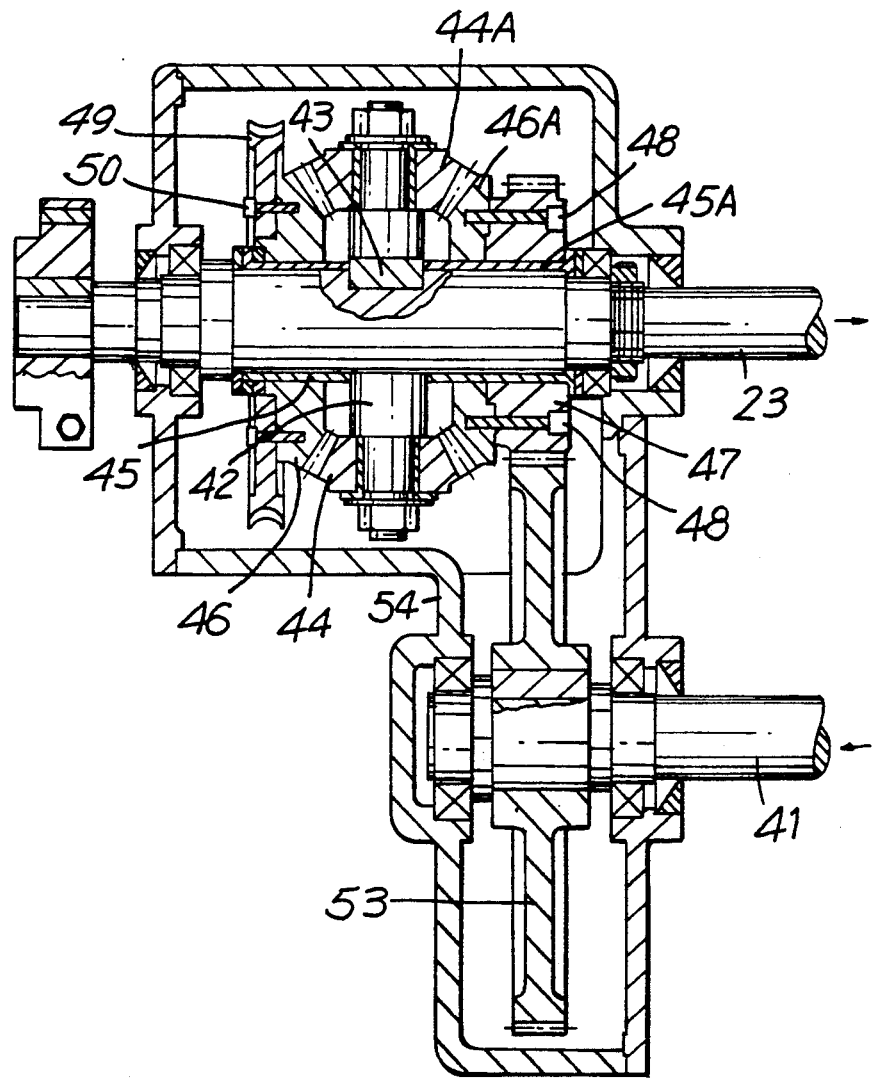
FIG. 7, is a sectional view showing in detail the phase shifter mechanism used with the apparatus of the present invention; and, FIG. 8, is another detailed view of an adjustment mechanism that is used with the apparatus of the present invention.
Figure 8:
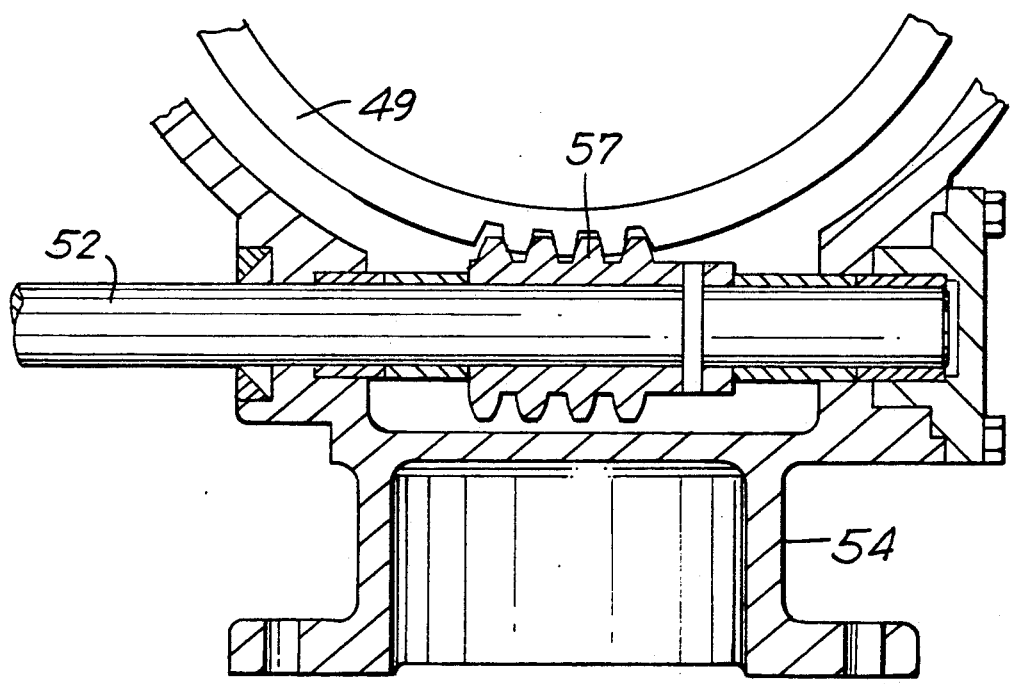

This phase shifter mechanism, as illustrated more clearly in FIGS. 6, 7 and 8, comprises a differential gearing composed of; a satellite carrier 42 keyed at 43 to a shaft 23 connected to drive the cams 22, 22A. A satellite gear 44, 44A is attached to each end of the satellite carrier 42. Bearings 45, 45A, are Positioned on the shaft 23 at each side of the satellite carrier 42. Planetary gears 46, 46A are supported on the bearings 45, 45A, and mesh with the satellite gears 44, 44A.

A pinion gear 47 is connected to the planetary gear 46A, by screws 48. A stator 49 is attached to the other planetary gear 46 by screws 50. The stator 49 is rotated by a worm screw 57 connected to a shaft 52, which is manually rotated to determine the extent of adjustment of the timing of the pushing and return strokes.

The coupling of the phase shifter mechanism MD to the quick return mechanism MRR, is through a gear 53 attached to the shaft 41 which meshes with the driven gear 47. A housing 54 houses the previously described mechanisms.

Through this arrangement, pushing and return stroke timing adjustments can be carried out with the apparatus in operation. Timing of the pushing and return strokes can be adjusted whether same be slower advance-quick return, or quick advance-slow return, or any other intermediate embodiments. This is done merely by turning shaft 52, which changes the position of the stator 49, and thus changes the operation and phase between output shaft 23 and input shaft from the quick return mechanism MRR. This permits changes as desired, generating a plurality of velocity profiles at the pushing and return strokes, so an ideal Pushing velocity for any type of container is obtained without the need of removing any of the mechanisms.

While a preferred embodiment of the invention has been described, it should be understood that various modifications thereof can be made without departing from the scope of the following claims.

We claim:

1. Apparatus for the controlled pushing of groups of articles assembled on a first lineal conveyor onto a second lineal conveyor extending transverse to said first lineal conveyor, said conveyors extending in horizontal planes, including a pusher mechanism supported on a stationary frame of said apparatus for movement transverse to said first conveyor and longitudinally of said second conveyor, said pusher mechanism also being supported for upwards swinging movement about an axis extending parallel to said first conveyor;

a drive mechanism for said pusher mechanism operative to drive said pusher mechanism at a fixed non-constant linear velocity;

a variable velocity drive mechanism;

a drive motor connected to an input shaft of said variable velocity drive mechanism;

said variable velocity drive mechanism having an output shaft which is driven at a determined constantly changing angular velocity by said variable velocity drive mechanism;

a phase shift mechanism having an input shaft connected to said output shaft connected to a drive mechanism of said pusher mechanism, said drive mechanism of said pusher mechanism providing for linear advance of a pusher of said mechanism during a forward stroke of said pusher, and then upwards swinging movement of said pusher during a return stroke of said pusher;

further including a manually-operable control that is operable during operation of said apparatus for changing the phase shift of said phase shift mechanism relative to said constantly changing angular velocity of said variable velocity drive mechanism and said non-constant linear velocity of said pusher mechanism, and thus change the timing and speed ratios of said pusher mechanism as desired during operation of said apparatus.

2. The apparatus of claim 1, in which said phase shift mechanism is comprised of a differential gearing having an input shaft carrying planetary gears, a pinion gear driven by said planetary gears and connected to drive said output shaft of said phase shift mechanism, and a stator gear providing a reaction member for said planetary gears, further including worm gear means operative to adjust the angular position of said stator gear upon manual rotation of said worm gear means.

3. The apparatus of claim 1, in which said pusher mechanism includes:

a carriage slidable on said stationary frame;

a pusher supported on said carriage for upwards pivotal movement relative to said carriage; and, lobe cam members connected to said carriage by hinged link members for reciprocating said carriage in forwards and return strokes, said lobe cam members being operative to pivot said pusher upwards during a return stroke of said carriage.

4. The apparatus of claim 3, further including cam means for moving said pusher laterally during a forwards stroke of said carriage, said lateral movement being at a velocity equal to the linear velocity of said first conveyor.

* * * * *